(12) United States Patent
Tanaka et al.

(10) Patent No.: US 7,256,948 B2
(45) Date of Patent: *Aug. 14, 2007

(54) ANTI-REFLECTION COATING, AND OPTICAL ELEMENT AND OPTICAL SYSTEM WITH ANTI-REFLECTION COATING

(75) Inventors: Issei Tanaka, Yokohama (JP); Tsuyoshi Murata, Kamakura (JP)

(73) Assignee: Nikon Corporation, Tokyo (JP)

( * ) Notice: Subject to any disclaimer, the term of this patent is extended or adjusted under 35 U.S.C. 154(b) by 98 days.

This patent is subject to a terminal disclaimer.

(21) Appl. No.: 11/091,410

(22) Filed: Mar. 29, 2005

(65) Prior Publication Data

US 2005/0225878 A1 Oct. 13, 2005

(30) Foreign Application Priority Data

Mar. 30, 2004 (JP) .............................. 2004-099131

(51) Int. Cl.
*G02B 1/10* (2006.01)
(52) U.S. Cl. ...................... 359/722; 359/586; 359/587; 359/589
(58) Field of Classification Search ................ 359/586, 359/587, 598, 722, 589
See application file for complete search history.

(56) References Cited

U.S. PATENT DOCUMENTS 3,781,090 A 12/1973 Sumita
4,128,303 A 12/1978 Onoki et al.
5,193,028 A 3/1993 Noguchi
5,993,898 A 11/1999 Nagatsuka et al. .......... 427/162
6,574,039 B1 6/2003 Murata et al. .............. 359/359
6,697,194 B2 * 2/2004 Kuschnereit et al. ....... 359/359
2002/0105721 A1 8/2002 Paul et al. ................... 359/359
2002/0191168 A1 12/2002 Ishizawa et al. .............. 355/53
2003/0020892 A1 * 1/2003 Orino ........................... 355/67
2004/0114248 A1 6/2004 Hokazono et al. .......... 359/603

FOREIGN PATENT DOCUMENTS

| EP | 0 994 368 | 4/2000 |
| EP | 1 152 263 | 11/2001 |
| JP | 60-29701 | 2/1985 |
| JP | 6-3501 | 1/1994 |
| JP | 10-221502 | 8/1998 |

(Continued)

OTHER PUBLICATIONS

P. Joosten et al., "Optical thin layers of $MgF_2$ produced by decomposition of organic magnesium-fluoro compounds," Applied Optics, vol. 24, No. 16, Aug. 15, 1985, pp. 2674-2678.

*Primary Examiner*—Scott J. Sugarman
(74) *Attorney, Agent, or Firm*—Miles & Stockbridge P.C.

(57) ABSTRACT

An anti-reflection coating is formed on an optical surface of an optical member for reducing the amount of light rays reflected from the optical surface. For light rays in a wavelength range from 400 nm to 700 nm, the anti-reflection coating has a reflectance of 0.5% or less if the light rays are incident on the optical surface at angles within a range from 0 to 25 degrees, and it has a reflectance of 3.5% or less if the light rays are incident at angles within a range from above 25 degrees to 60 degrees.

34 Claims, 4 Drawing Sheets

FOREIGN PATENT DOCUMENTS

| | | |
|---|---|---|
| JP | 2000-249820 | 9/2000 |
| JP | 2000-356704 | 12/2000 |
| JP | 2000-357654 | 12/2000 |
| JP | 2002-311204 | 10/2002 |
| JP | 2004-302113 | 10/2004 |
| JP | 2005-114881 | 4/2005 |

* cited by examiner

ANTI-REFLECTION COATING, AND OPTICAL ELEMENT AND OPTICAL SYSTEM WITH ANTI-REFLECTION COATING

INCORPORATION BY REFERENCE

The disclosures of the following priority application is herein incorporated by reference:
Japanese Patent Application No. 2004-099131 filed on Mar. 30, 2004.

FIELD OF THE INVENTION

The present invention relates to an anti-reflection coating provided on an optical element, which is used at a plurality of wavelengths or bandwidths, for example, in a photographic optical system, a binocular, a telescope, a microscope and the like. The present invention relates also to an optical element and an optical system that are provided with anti-reflection coatings.

BACKGROUND OF THE INVENTION

Anti-reflection coatings are provided to reduce the reflection that occurs from the difference in refractive index between the media of optical elements that are incorporated in an optical system. If such reflected light rays are allowed to reach the image plane, then a ghost or a flare can appear, severely degrading the optical performance of the system. In recent years, optical systems have been required to have increasingly higher optical performance, so the anti-reflection coatings provided on optical elements in an optical system are likewise required to provide increasingly lower degrees of reflection in a range of incident angles wider than ever before.

To meet such demands, progress has been made in the field of multilayer-film design technique, where various materials and film thicknesses are applied in combination, as well as in the field of multilayer coating technique (for example, refer to Japanese Laid-Open Patent Publication No. 2000-356704).

However, there has been a problem in the prior-art anti-reflection coating. If the angle of light rays incident to an optical surface where anti-reflection coating is provided increases greatly, the light rays entering obliquely, then this condition causes a rapid change in the property of the anti-reflection coating and abruptly weakens the effectiveness of the anti-reflection coating. As a result, there is an increase in the amount of light reflected. In a case where such a reflective surface exists singularly in an optical system, the reflected light is directed toward an object being observed through the system, so the above-mentioned problem does not affect directly the optical performance of the system. However, if a plurality of such surfaces are present, then the system is subject to high probability a ghost or a flare, which is caused by the reflected light reaching the image. Nowadays, lenses are fabricated to have large diameters, and this manufacturing trend contributes to increases in the angular range of light rays that are incident to optical elements. As a result, optical systems are now prone to experience ghosts and flares.

SUMMARY OF THE INVENTION

In consideration of the above mentioned problem, it is an object of the present invention to provide an anti-reflection coating that realizes a low reflectance for light rays in a wide range of incident angles in the visible light range. It is also an object of the present invention to provide an optical element and an optical system that are equipped with such an anti-reflection coating.

To solve the above mentioned problem, an anti-reflection coating according to a first aspect of the present invention is provided on an optical surface of an optical member for reducing the amount of light rays reflected from the optical surface. For light rays in a wavelength range from 400 nm to 700 nm, the anti-reflection coating has a reflectance of 0.5% or less if the light rays are incident on the optical surface at angles within a range from 0 to 25 degrees, and it has a reflectance of 3.5% or less if the light rays are incident at angles within a range from 0 to 60 degrees.

Also, an anti-reflection coating according to a second aspect of the present invention is provided on an optical surface of an optical member for reducing the amount of light rays reflected from the optical surface. In this case, the anti-reflection coating comprises a plurality of successively superposed layers, and at least one layer is formed by using a sol-gel method. For light rays in a wavelength range from 400 nm to 700 nm, the anti-reflection coating has a reflectance of 0.5% or less if the light rays are incident on the optical surface at angles within a range from 0 to 25 degrees, and it has a reflectance of 3.5% or less if the light rays are incident at angles within a range from 0 to 60 degrees.

It is preferable that, for an optical member having a refractive index of approximately 1.52, the anti-reflection coating comprise a first layer, which is formed on the optical surface, with a refractive index of approximately 1.65 and an optical film thickness of approximately $0.27\lambda$, a second layer, which is formed on the first layer, with a refractive index of approximately 2.12 and an optical film thickness of approximately $0.07\lambda$, a third layer, which is formed on the second layer, with a refractive index of approximately 1.65 and an optical film thickness of approximately $0.30\lambda$, and a fourth layer, which is formed on the third layer, with a refractive index of approximately 1.25 and an optical film thickness of approximately $0.26\lambda$, "$\lambda$" being a reference light-ray wavelength of 550 nm.

Furthermore, it is preferable that the anti-reflection coating be formed in the following way. The first layer is made from aluminum oxide by a vacuum deposition; the second layer is made from a mixture of titanium oxide and zirconium oxide also by a vacuum deposition; the third layer is made from aluminum oxide also by a vacuum deposition; and the fourth layer is made from magnesium fluoride by a sol-gel method.

An optical element according to the present invention comprises an optical member, whose optical surface is a plane or a curved surface, and any of the above described anti-reflection coatings, which is provided on the optical surface of the optical member.

Furthermore, an optical system according to a first aspect of the present invention comprises an optical element (for example, the negative meniscus lens L1 described in the following embodiment), which is positioned between an object and an image plane. In this case, at least one of the optical surfaces of the optical element is provided with any of the above described anti-reflection coatings.

Also, an optical system according to a second aspect of the present invention comprises a plurality of optical surfaces, and at least one of an n-th ghost-generating surface (for example, the object-side surface 3 of the negative meniscus lens L2) and an m-th ghost-generating surface (for example, the image-side surface 2 of the negative meniscus lens L1) of the optical surfaces is provided with any of the above described anti-reflection coatings. In this case, the optical system is constructed to satisfy the following formula:

$$Rn \times Rm \leq 0.10[\%].$$

In the formula, "Rn" represents the reflectance of the n-th ghost-generating surface, and "Rm" represents the reflectance of the m-th ghost-generating surface.

It is preferable that the optical systems according to the first and second aspects of the present invention be used for light rays in a wavelength range from 400 nm to 700 nm.

Moreover, it is preferable that the optical system according to the present invention be used as an imaging optical system or a viewing optical system.

By the anti-reflection coating, which is provided as described above, the present invention achieves a low reflectance for light rays in the visible light range (400 nm~700 nm in wavelength) entering in a wide range of incident angles (0~60 deg). As a result, for the optical element and the optical system equipped with the anti-reflection coating, the present invention can reduce the occurrence of a ghost and a flare effectively.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

DESCRIPTION OF THE PREFERRED EMBODIMENTS

Now, preferred embodiments according to the present invention are described in reference to the drawings.

EXAMPLE 1

Figure 1:
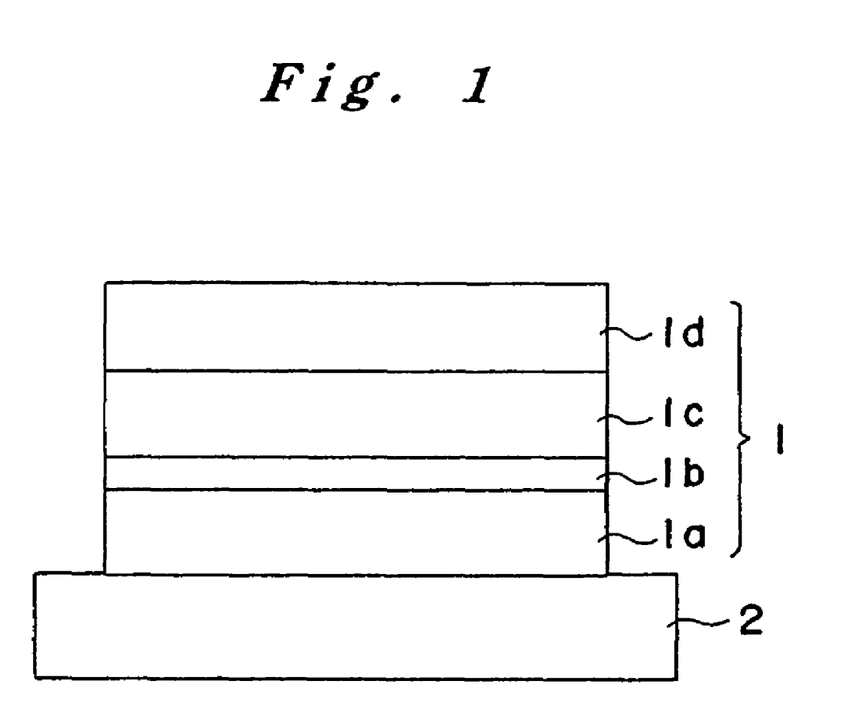
FIG. 1 shows the structure of an anti-reflection coating according to the present invention.

At first, an anti-reflection coating 1 as a first embodiment is described in reference to FIG. 1. The anti-reflection coating 1 comprises four layers, which are formed on an optical surface of an optical member 2. A first layer 1a, which is made from aluminum oxide, is coated on the optical member 2 by a vacuum deposition, and a second layer 1b, which is made from a mixture of titanium oxide and zirconium oxide, is coated on the first layer 1a also by a vacuum deposition. Furthermore, a third layer 1c, which is made from aluminum oxide, is coated on the second layer 1b also by a vacuum deposition, and a fourth layer 1d, which is made from magnesium fluoride, is coated on the third layer 1c by a sol-gel method. As a result, these four layers together constitute the anti-reflection coating 1 as a first embodiment. Here, the sol-gel method is a processing in which a film is formed on an optical surface of an optical member by applying a sol of a film-forming material and by letting a gel film deposit, and then by dipping the film into a liquid, which is evaporated in a critical state at a critical temperature and a critical pressure to dry the film.

In this way, the first through third layers 1a~1c of the anti-reflection coating 1 are coated by electron-beam evaporations, which are a dry process. However, the fourth layer 1d, which is the uppermost layer, is coated by the following procedure, which is a wet process that uses a sol prepared by a process that uses hydrofluoric acid and magnesium acetate (this process is hereinafter referred to also as "hydrofluoric acid and magnesium acetate method"). Beforehand, the surface of the lens to be coated by this procedure (the above-mentioned optical surface of the optical member 2) is coated successively with an aluminum oxide layer as the first layer 1a, a titanium oxide and zirconium oxide mixed layer as the second layer 1b and an aluminum oxide as the third layer 1c by using a vacuum metallizer. After the optical member 2 is taken out of the vacuum metallizer, the surface of the lens is spin-coated with a sol prepared by a hydrofluoric acid and magnesium acetate method to form a magnesium fluoride layer as the fourth layer 1d. The following (1) is the reaction formula of the hydrofluoric acid and magnesium acetate method.

$$2HF + Mg(CH_3COO)_2 \rightarrow MgF_2 + 2CH_3COOH \qquad (1)$$

As a sol to be used for the coating, raw materials are mixed and then aged at a high pressure and a high temperature for 24 hours in an autoclave before being applied in the coating. After the optical member 2 is coated with the fourth layer 1d, it is heated at 150 deg C. for an hour in the atmosphere to complete the layer. In the sol-gel method, atoms or molecules gather into particles, each particle comprising a few atoms or molecules to tens of atoms or molecules, and the sizes of the particles range from a few nanometers to tens of nanometers. Furthermore, these particles gather into secondary particles, each secondary particle comprising a few original particles, and then these secondary particles deposit to form the fourth layer 1d.

Figure 2:
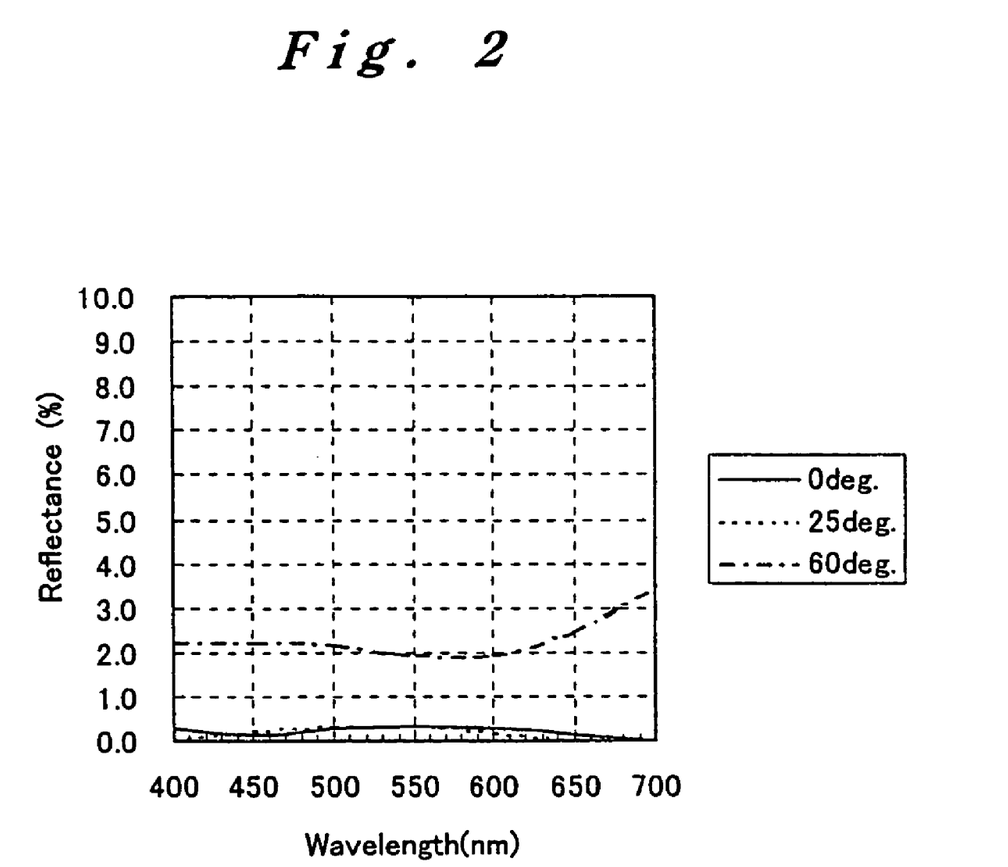
FIG. 2 is a graph, which shows the spectral characteristics of the anti-reflection coating according to the present invention.

Now, the optical performance of the anti-reflection coating 1, which is formed in the above described way, is explained in reference to FIG. 2, which shows the spectral characteristics of the optical member 2 having a refractive index of 1.52 for a reference wavelength λ of 550 nm. Specifically, in this case, the refractive index of the first layer 1a having an optical film thickness of 0.27λ is 1.65; the refractive index of the second layer 1b having an optical film thickness of 0.07λ is 2.12; the refractive index of the third layer 1c having an optical film thickness of 0.30λ is 1.65; and the refractive index of the fourth layer 1d having an optical film thickness of 0.26λ is 1.25. It is clear from FIG. 2 that the anti-reflection coating 1 achieves substantially low reflectances for light rays in the visible light range (400 nm~700 nm in wavelength). For example, the reflectance is below 3.5% even at an incident angle of 60 degrees while it is below 0.5% in a range from 0 to 25 degrees. Furthermore, the reflectance is stable either to the short wave side (near 400 nm) or to the long wave side (near 700 nm) from the reference wavelength λ, so the anti-reflection coating demonstrates a uniform effect in a wavelength range from 400 nm to 700 nm.

Furthermore, this anti-reflection coating 1 can be provided on an optical surface of a plane-parallel plate as an optical element or on an optical surface of a lens that is formed with a curvature as described in the following second embodiment.

EXAMPLE 2

Figure 3:
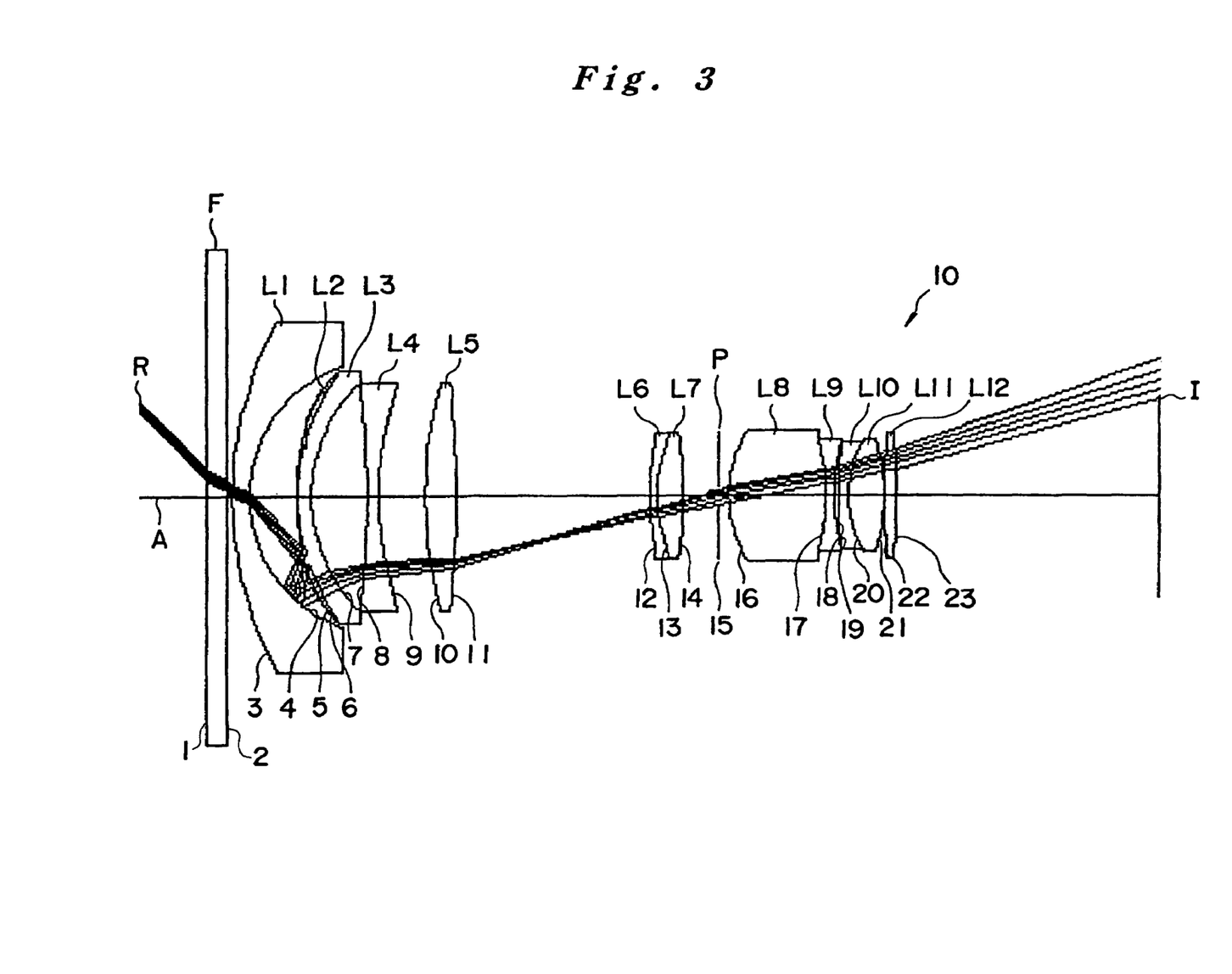
FIG. 3 is the lens arrangement of an imaging optical system, which includes optical elements with the anti-reflection coating according to the present invention.

Now, an imaging optical system 10, which comprises an optical element with the above described anti-reflection coating 1, is described as a second embodiment in reference to FIG. 3. The imaging optical system 10 is to be used as a zoom lens for a camera, which provides continuously variable focal lengths from 18 mm to 35 mm. For imaging an object on an image plane I, the imaging optical system 10 comprises, in aligned order from the side facing the object, a plane-parallel plate F as a protective glass, a negative meniscus lens L1, which is convex to the side of the object, a cemented lens that includes a negative meniscus lens L2 and a negative meniscus lens L3 cemented together with their convexities facing toward the object, a biconcave lens L4, a biconvex lens L5, a cemented lens that includes a negative meniscus lens L6 and a biconvex lens L7 cemented together with the convexity of the meniscus lens L6 facing toward the object, an aperture diaphragm P, a cemented lens that includes a biconvex lens L8 and a biconcave lens L9 cemented together, a cemented lens that includes a negative meniscus lens L10 and a biconvex lens L11 cemented together with the convexity of the meniscus lens L10 facing toward the object, and a biconvex lens L12. It should be noted here that, in the imaging optical system 10, the surface (surface number 3) of the negative meniscus lens L2 facing to the object is an aspherical surface.

The shape of the aspherical surface is defined by the following equation (2), where "y" is the height in the direction perpendicular to the optical axis, "x(y)" is the distance along the optical axis from the plane tangent to the vertex of the aspherical surface to a point at the height y on the aspherical surface, "r" is the paraxial radius of curvature (the radius of curvature of the datum sphere), "k" is a conic section constant, and "$C_n$" is the n-th aspherical coefficient.

$$x(y) = (y^2/r)/\left(1 + (1 - k(y^2/r^2))^{1/2}\right) + C_4 y^4 + C_6 y^6 + C_8 y^8 + C_{10} y^{10} \quad (2)$$

Table 1 below lists the properties of the lenses of the imaging optical system 10 as the first embodiment. Surface numbers 1~23 in Table 1 correspond to numerals 1~23 in FIG. 3, which describes the imaging optical system 10. Respectively, "r" in Table 1 is the radius of curvature of each lens surface, and "d" is the distance between the lens surface to the next lens surface in order. "vd" is the Abbe constant for the d line, and "nd" is the refractive index for the d line. "f" is the focal length, and the "Bf" is the back focus. The units of the values for the focal length f, the radius of curvature r, the surface distance d and the like listed below are "mm" unless mentioned otherwise. However, the units are not limited to "mm", and other appropriate units can be applied since any optical system displays an equivalent optical performance as it is enlarged or contracted proportionally. Furthermore, in the values of the aspherical coefficients $C_n$ (n=4, 6, 8, 10), for example, the factor "E-09" represents "$\times 10^{-9}$". In Table 1 below, the surfaces that are not spherical are marked with "*" next to the corresponding surface numbers.

TABLE 1 f = 18.500
Bf = 38.272

| Surface number | r | d | vd | nd | |
|---|---|---|---|---|---|
| 1 | ∞ | 3.000 | 64.1 | 1.51680 | F |
| 2 | ∞ | 2.500 | | 1.00000 | |
| 3 | 50.76 | 2.500 | 45.3 | 1.79500 | L1 |
| 4 | 19.41 | 7.000 | | 1.00000 | |
| 5* | 44.27 | 0.100 | 55.6 | 1.50625 | L2 |
| 6 | 28.81 | 2.000 | 45.3 | 1.79500 | L3 |
| 7 | 22.20 | 8.200 | | 1.00000 | |
| 8 | −121.57 | 1.700 | 44.8 | 1.74400 | L4 |
| 9 | 49.85 | 6.800 | | 1.00000 | |
| 10 | 58.05 | 4.500 | 28.6 | 1.79504 | L5 |
| 11 | −149.17 | 28.422 | | 1.00000 | |
| 12 | 51.03 | 1.000 | 47.4 | 1.78800 | L6 |
| 13 | 23.03 | 3.800 | 56.4 | 1.50137 | L7 |
| 14 | −54.97 | 5.166 | | 1.00000 | |
| 15 | ∞ | 1.500 | 8.6 | 1.00000 | P |
| 16 | 17.65 | 14.200 | 59.5 | 1.53996 | L8 |
| 17 | −27.28 | 1.300 | 45.3 | 1.79500 | L9 |
| 18 | 32.29 | 0.700 | | 1.00000 | |
| 19 | 110.45 | 1.300 | 37.4 | 1.83400 | L10 |
| 20 | 14.03 | 5.300 | 82.5 | 1.49782 | L11 |
| 21 | −23.36 | 0.100 | | 1.00000 | |
| 22 | 138.28 | 1.600 | 59.5 | 1.53996 | L12 |
| 23 | −138.28 | | | 1.00000 | |

(Data for the aspherical surfaces)
Surface number 5
k = 5.435

$C_4$ = 7.1876E−06        $C_6$ = −3.6412E−09
$C_8$ = 3.9918E−11        $C_{10}$ = −3.3225E−14

As shown in FIG. 3, if a light ray R from the side of the object enters the imaging optical system 10 at an incident angle of 45 degrees, which is the angle between the light ray R and the optical axis A, then the light ray reflects at the object-side surface of the negative meniscus lens L2 (first ghost-generating surface with surface number 5). This reflected light reflects again at the image-side surface of the negative meniscus lens L1 (second ghost-generating surface with surface number 4), and then it reaches the image plane I to generate a ghost. In the illustrative embodiment, the aperture diaphragm P is contracted to the size equivalent to F-number 22, F-number being an indicator of lens brightness.

Figure 4:
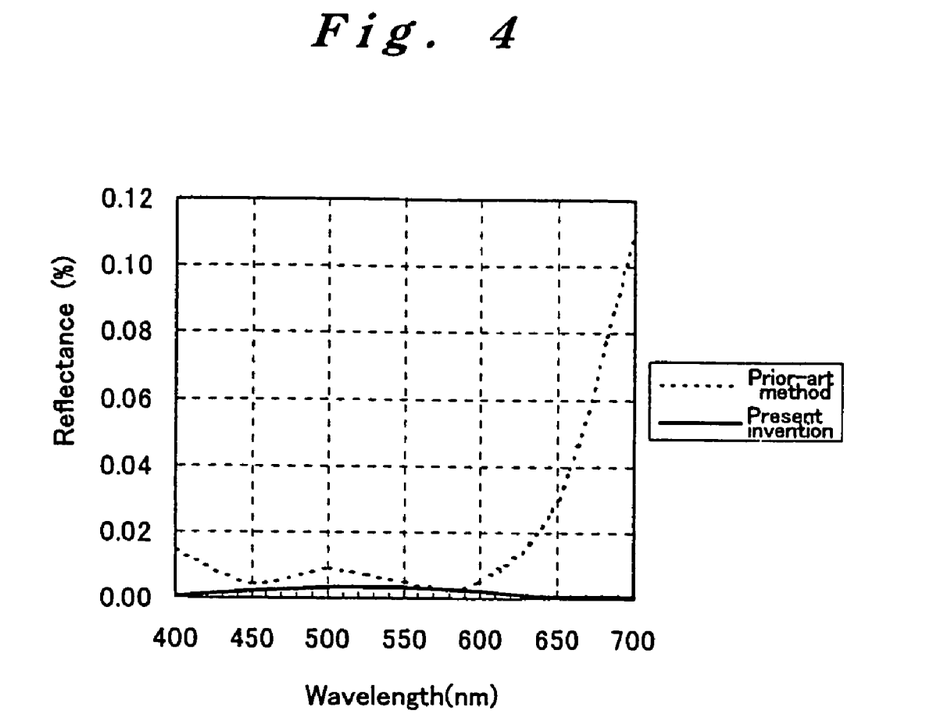
FIG. 4 is a graph, which shows the spectral characteristics of the imaging optical system according to the present invention.

Now, if the angles of the light ray R incident at the ghost-generating surfaces are considered, the angle of the light ray R incident at the first ghost-generating surface (surface number 5) is approximately 60 degrees while that of the light ray R reflected at the first ghost-generating surface and then incident at the second ghost-generating surface (surface number 4) is approximately 25 degrees. Therefore, the optical performance of a case where these ghost-generating surfaces (surface numbers 4 and 5) are provided with the anti-reflection coating 1 of the first embodiment is described in detail in reference to FIG. 4, which shows spectral characteristics. The curve labeled "prior-art method" used in FIG. 4 represents a case where a prior-art anti-reflection coating, which comprises five layers, is used. It is clear from FIG. 4 that, by providing the anti-reflection coating 1 of the first embodiment on the ghost-generating surfaces, the present invention achieves lower values in reflectance for light rays in a wavelength range from 400 nm to 700 nm than the prior-art method, and that the amount of light reaching image plane I as a ghost is reduced effectively.

The reflectance of the imaging optical system 10, which is plotted in the graph, is the product of the reflectance of the first ghost-generating surface (surface number 5) and that of the second ghost-generating surface (surface number 4). As a result, the values of the reflectance for the system are smaller than 0.10%. From this functional relation, the imaging optical system 10, whose ghost-generating surfaces are provided with the anti-reflection coating 1 of the first embodiment, satisfies the following formula:

$$Rn \times Rm \leq 0.10 [\%] \quad (3)$$

wherein the "Rn" represents the reflectance of the n-th ghost-generating surface while the "Rm" represents that of the m-th ghost-generating surface.

It is preferable that the imaging optical system 10 be constructed such that the product, "Rn×Rm", in formula (3) is equal to or smaller than 0.05 [%] to achieve a more favorable optical performance.

Furthermore, the anti-reflection coating 1 is provided on the image-side surface of the plane-parallel plate F, which is positioned closest to the object in the imaging optical system 10, to effectively prevent a ghost that would be otherwise generated at that surface. Moreover, even if the imaging optical system 10 comprises an eyepiece on the image side thereof to be used as a viewing optical system, the anti-reflection coating 1 can perform the same effect to suppress a ghost or a flare in achieving a sharp image for viewing.

As described above, the anti-reflection coating 1 in the above embodiment can provide an optical element with a low reflectance in a wide angular range in the visible light range (400 nm~700 nm). By realizing such an optical element to be used in an optical system, the present invention provides an optical system that has a high optical performance, which is not affected by a ghost and a flare.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An anti-reflection coating formed on an optical surface of an optical member for reducing an amount of light rays reflected from said optical surface, wherein:
   for light rays in a wavelength range from 400 nm to 700 nm,
   said anti-reflection coating has:
   a reflectance of 0.5% or less if said light rays are incident on said optical surface at angles within a range from 0 to 25 degrees, and
   a reflectance of 3.5% or less if said light rays are incident on said optical surface at angles within a range from above 25 degrees to 60 degrees.

2. The anti-reflection coating set forth in claim 1, wherein:
   said anti-reflection coating comprises multiple layers; and
   at least one of said layers is formed by using a sol-gel method.

3. The anti-reflection coating set forth in claim 2, wherein:
   said optical member has a refractive index of approximately 1.52; and
   said anti-reflection coating comprises:
   a first layer, which is formed on said optical surface, said first layer having a refractive index of approximately 1.65 and an optical film thickness of approximately $0.27\lambda$;
   a second layer, which is formed on said first layer, said second layer having a refractive index of approximately 2.12 and an optical film thickness of approximately $0.07\lambda$;
   a third layer, which is formed on said second layer, said third layer having a refractive index of approximately 1.65 and an optical film thickness of approximately $0.30\lambda$; and
   a fourth layer, which is formed on said third layer, said fourth layer having a refractive index of approximately 1.25 and an optical film thickness of approximately $0.26\lambda$;
   "$\lambda$" being a reference light-ray wavelength of 550 nm.

4. The anti-reflection coating set forth in claim 3, wherein:
   said first layer is made from aluminum oxide by a vacuum deposition;
   said second layer is made from a mixture of titanium oxide and zirconium oxide by vacuum deposition;
   said third layer is made from aluminum oxide by vacuum deposition; and
   said fourth layer is made from magnesium fluoride by a sol-gel method.

5. The anti-reflection coating set forth in claim 1, wherein:
   said anti-reflection coating comprises multiple layers; and
   at least one of said layers has a refractive index equal to or smaller than 1.3.

6. The anti-reflection coating set forth in claim 5, wherein:
   said optical member has a refractive index of approximately 1.52; and
   said anti-reflection coating comprises:
   a first layer, which is formed on said optical surface, said first layer having a refractive index of approximately 1.65 and an optical film thickness of approximately $0.27\lambda$;
   a second layer, which is formed on said first layer, said second layer having a refractive index of approximately 2.12 and an optical film thickness of approximately $0.07\lambda$;
   a third layer, which is formed on said second layer, said third layer having a refractive index of approximately 1.65 and an optical film thickness of approximately $0.30\lambda$; and
   a fourth layer, which is formed on said third layer, said fourth layer having a refractive index of approximately 1.25 and an optical film thickness of approximately $0.26\lambda$;
   "$\lambda$" being a reference light-ray wavelength of 550 nm.

7. The anti-reflection coating set forth in claim 6, wherein:
   said first layer is made from aluminum oxide by a vacuum deposition;
   said second layer is made from a mixture of titanium oxide and zirconium oxide by vacuum deposition;
   said third layer is made from aluminum oxide by vacuum deposition; and
   said fourth layer is made from magnesium fluoride by a sol-gel method.

8. The anti-reflection coating set forth in claim 1, wherein:
   said optical member has a refractive index of approximately 1.52; and
   said anti-reflection coating comprises:
   a first layer, which is formed on said optical surface, said first layer having a refractive index of approximately 1.65 and an optical film thickness of approximately $0.27\lambda$;

a second layer, which is formed on said first layer, said second layer having a refractive index of approximately 2.12 and an optical film thickness of approximately 0.07λ;

a third layer, which is formed on said second layer, said third layer having a refractive index of approximately 1.65 and an optical film thickness of approximately 0.30λ; and a fourth layer, which is formed on said third layer, said fourth layer having a refractive index of approximately 1.25 and an optical film thickness of approximately 0.26λ;

"λ" being a reference light-ray wavelength of 550 nm.

9. The anti-reflection coating set forth in claim 8, wherein:
said first layer is made from aluminum oxide by a vacuum deposition;
said second layer is made from a mixture of titanium oxide and zirconium oxide by vacuum deposition;
said third layer is made from aluminum oxide by vacuum deposition; and
said fourth layer is made from magnesium fluoride by a sol-gel method.

10. An optical element comprising an optical member having an optical surface which is a plane or a curved surface, and an anti-reflection coating which is formed on the optical surface of said optical member for reducing an amount of light rays reflected from said optical surface, wherein:
for light rays in a wavelength range from 400 nm to 700 nm,
said anti-reflection coating has:
a reflectance of 0.5% or less if said light rays are incident on said optical surface at angles within a range from 0 to 25 degrees, and
a reflectance of 3.5% or less if said light rays are incident on said optical surface at angles within a range from above 25 degrees to 60 degrees.

11. The optical element set forth in claim 10, wherein:
said anti-reflection coating comprises multiple layers; and
at least one of said layers is formed by using a sol-gel method.

12. The optical element set forth in claim 10, wherein:
said anti-reflection coating comprises multiple layers; and
at least one of said layers has a refractive index equal to or smaller than 1.3.

13. An optical system comprising an optical element, which is positioned between an object and an image plane, wherein:
at least one optical surface of said optical element is provided with an anti-reflection coating; and
for light rays in a wavelength range from 400 nm to 700 nm,
said anti-reflection coating has:
a reflectance of 0.5% or less if said light rays are incident on said optical surface at angles within a range from 0 to 25 degrees, and
a reflectance of 3.5% or less if said light rays are incident on said optical surface at angles within a range from above 25 degrees to 60 degrees.

14. The optical system set forth in claim 13, wherein:
said anti-reflection coating comprises multiple layers; and
at least one of said layers is formed by using a sol-gel method.

15. The optical system set forth in claim 13, wherein:
said anti-reflection coating comprises multiple layers; and
at least one of said layers has a refractive index equal to or smaller than 1.3.

16. The optical system set forth in claim 13 to be used for light rays in a wavelength range from 400 nm to 700 nm.

17. The optical system set forth in claim 13, said optical system constituting an imaging optical system.

18. The optical system set forth in claim 13, said optical system constituting a viewing optical system.

19. An optical system comprising a plurality of optical surfaces, wherein:
at least one of an n-th ghost-generating surface and an m-th ghost-generating surface of said optical surfaces is provided with an anti-reflection coating; and
for light rays in a wavelength range from 400 nm to 700 nm,
said anti-reflection coating has:
a reflectance of 0.5% or less if said light rays are incident on said optical surface at angles within a range from 0 to 25 degrees, and
a reflectance of 3.5% or less if said light rays are incident on said optical surface at angles within a range from above 25 degrees to 60 degrees; and
said optical system satisfies the following formula $$Rn \times Rm \leq 0.10[\%]$$

with "Rn" representing the reflectance of said n-th ghost-generating surface and "Rm" representing the reflectance of said m-th ghost-generating surface.

20. The optical system set forth in claim 19, wherein:
said anti-reflection coating comprises multiple layers; and
at least one of said layers is formed by using a sol-gel method.

21. The optical system set forth in claim 19, wherein:
said anti-reflection coating comprises multiple layers; and
at least one of said layers has a refractive index equal to or smaller than 1.3.

22. The optical system set forth in claim 19 to be used for light rays in a wavelength range from 400 nm to 700 nm.

23. The optical system set forth in claim 19, said optical system constituting an imaging optical system.

24. The optical system set forth in claim 19, said optical system constituting a viewing optical system.

25. A method for reducing an amount of light rays reflected from an optical surface of an optical member, the method comprising:
forming an anti-reflection coating on said optical surface such that, for light rays in a wavelength range from 400 nm to 700 nm, the anti-reflection coating has:
a reflectance of 0.5% or less if said light rays are incident on said optical surface at angles within a range from 0 to 25 degrees, and
a reflectance of 3.5% or less if said light rays are incident on said optical surface at angles within a range from above 25 degrees to 60 degrees.

26. The method according to claim 25, wherein the anti-reflection coating includes multiple layers, at least one of said layers being formed by a sol-gel method.

27. The method according to claim 25, wherein the anti-reflection coating includes multiple layers, at least one of said layers having a refractive index equal to or smaller than 1.3.

28. A method for forming an optical element, comprising:
providing an optical member having an optical surface which is a plane or a curved surface, and
forming an anti-reflection coating on said optical surface of said optical member such that for light rays in a wavelength range from 400 nm to 700 nm, the anti-reflection coating has:

a reflectance of 0.5% or less if said light rays are incident on said optical surface at angles within a range from 0 to 25 degrees, and a reflectance of 3.5% or less if said light rays are incident on said optical surface at angles within a range from above 25 degrees to 60 degrees.

29. The method according to claim 28, wherein the includes multiple layers, at least one of said layers being formed by a sol-gel method.

30. The method according to claim 28, wherein the includes multiple layers, at least one of said layers having a refractive index equal to or smaller than 1.3.

31. A method for forming an optical system, comprising:

providing an optical element, which is positioned between an object and an image plane, wherein at least one optical surface of said optical element is provided with an anti-reflection coating, and for light rays in a wavelength range from 400 nm to 700 nm, the anti-reflection coating has:

a reflectance of 0.5% or less if said light rays are incident on said optical surface at angles within a range from 0 to 25 degrees, and a reflectance of 3.5% or less if said light rays are incident on said optical surface at angles within a range from above 25 degrees to 60 degrees.

32. The method according to claim 31, wherein the anti-reflection coating includes multiple layers, at least one of said layers being formed by a sol-gel method.

33. The method according to claim 31, wherein the anti-reflection coating includes multiple layers, at least one of said layers having a refractive index equal to or smaller than 1.3.

34. A method for forming an optical system having a plurality of optical surfaces, the method comprising:

providing at least one of an n-th ghost-generating surface and an m-th ghost-generating surface of said optical surfaces with an anti-reflection coating, wherein for light rays in a wavelength range from 400 nm to 700 nm, the anti-reflection coating has:

a reflectance of 0.5% or less if said light rays are incident on said optical surface at angles within a range from 0 to 25 degrees, and a reflectance of 3.5% or less if said light rays are incident on said optical surface at angles within a range from above 25 degrees to 60 degrees, and the following formula is satisfied:

$$Rn \times Rm \leq 0.10[\%]$$

"Rn" representing the reflectance of said n-th ghost-generating surface, and "Rm" representing the reflectance of said m-th ghost-generating surface.

* * * * *